US008524027B2

(12) United States Patent
Anwar et al.

(10) Patent No.: US 8,524,027 B2
(45) Date of Patent: Sep. 3, 2013

(54) LABEL DISPENSING DEVICE AND METHOD

(75) Inventors: Sohail Anwar, New Berlin, WI (US); Peter Hartmann, Omaha, NE (US)

(73) Assignee: Brady Worldwide, Inc., Milwaukee, WI (US)

( * ) Notice: Subject to any disclaimer, the term of this patent is extended or adjusted under 35 U.S.C. 154(b) by 16 days.

(21) Appl. No.: 13/191,990

(22) Filed: Jul. 27, 2011

(65) Prior Publication Data

US 2013/0025776 A1 Jan. 31, 2013

(51) Int. Cl.

| | |
|---|---|
| ***B29C 65/48*** | (2006.01) |
| ***B32B 37/26*** | (2006.01) |
| ***B32B 38/10*** | (2006.01) |
| ***B32B 38/14*** | (2006.01) |
| ***B32B 39/00*** | (2006.01) |
| ***B32B 43/00*** | (2006.01) |

(52) U.S. Cl.
USPC ........... 156/247; 156/249; 156/277; 156/289; 156/701; 156/719; 156/384; 156/387; 156/537; 156/750; 156/764; 156/767

(58) Field of Classification Search
USPC ................. 156/247, 249, 277, 289, 701, 719, 156/384, 387, 537, 750, 764, 767
See application file for complete search history.

(56) References Cited

U.S. PATENT DOCUMENTS

| | | | | |
|---|---|---|---|---|
| 5,133,396 | A * | 7/1992 | Selak et al. | 156/361 |
| 6,766,844 | B1 | 7/2004 | Watkins | |
| 2004/0050497 | A1 | 3/2004 | Presutti et al. | |
| 2004/0079490 | A1 | 4/2004 | Ito | |

FOREIGN PATENT DOCUMENTS

| | | | |
|---|---|---|---|
| CA | 1032907 | A1 | 6/1978 |
| FR | 2661394 | A1 | 10/1991 |
| FR | 2759618 | A1 | 8/1998 |
| GB | 2464218 | A | 4/2010 |
| WO | 2006033976 | A2 | 3/2006 |

OTHER PUBLICATIONS

PCT International Search Report for PCT/GB2010/051702 which is commonly assigned to Applicant; mailed Oct. 28, 2011; 4 pages.
PCT International Search Report for corresponding International Application No. PCT/US2012/047183, dated Oct. 20, 2012, 5 pages.

* cited by examiner

*Primary Examiner* — Sing P Chan
(74) *Attorney, Agent, or Firm* — Quarles & Brady LLP

(57) ABSTRACT

A label dispensing device is disclosed for dispensing labels from a web that has a web path extending through the label dispensing device. The label dispensing device includes a dispensing member and a transition member. The dispensing member is shaped to effectuate a flexure of the web and includes a peel edge disposed along a portion of the web path. The transition member has a web control surface disposed along a portion of the web path. The web control surface is downstream of the peel edge and is configured to engage the first side of the web, thereby reducing the flexure of the web effectuated by the dispensing member.

20 Claims, 7 Drawing Sheets

LABEL DISPENSING DEVICE AND METHOD

CROSS-REFERENCE TO RELATED APPLICATIONS

Not applicable.

STATEMENT OF FEDERALLY SPONSORED RESEARCH OR DEVELOPMENT

Not applicable.

BACKGROUND

This disclosure relates to label dispensing devices and related methods of use. In particular, this disclosure relates to devices for the dispensing of labels carried on a liner or web.

Label printers are commonly used to print text, barcodes, and other images. For such label printers, labels are usually provided on a release liner from which the labels can be separated. Typically, a web is fed through the printer with the labels on the liner and, after printing, the printed label may be removed from the web and applied to an item.

Many label printers require that, after the label has been printed, a user manually remove the printed label from the web and then apply the printed label to an object. However, to facilitate efficiency in high-throughput working environments, some printers have been designed to perform some of these routine actions that would otherwise need to be manually performed by the user.

For example, GB patent application no. 2464218 discloses a printer configured to automatically separate a label from a liner. Such separation is achieved by bending the liner with the label still attached in a direction transverse to the feed direction. Then, the bent label and liner are fed over the edge of a beak, at which point the direction of travel of the bent web changes approximately 90 degrees within a very short distance. Because the label is more stiff than the liner, when the bent web is run over the beak, the label separates from the liner.

The separation beaks or label dispensers of existing printers are somewhat limited in their range of application. Among other things, the materials of the web and liner are restricted in part by the mode of operation of the label dispenser. For example, for printers that periodically print labels, in order to separate the label from the liner, the liner would need to be run sufficiently far forward to separate the end of the label from the liner. To make sure the next label on the liner was properly situated for printing, either (1) the labels would need to be greatly spaced on the liner or (2) the liner would need to be fed backwards to place the next label in proper position for printing. The first option wasted liner material and increased scrap. The second option limited the types of materials that could be used for the liner, as the repeated forward and backward feeding of a bent or creased liner over the beak fatigued the liner and, depending on the material of the liner, could rupture the liner under sufficient tension. Moreover, backward feeding may require additional components to enable this direction of feeding and raise the cost of the printer.

A need still remains, however, for improvements to label dispensing devices and label printers.

SUMMARY OF THE INVENTION

To better accommodate a wide range of label and liner materials in a label dispensing device, it has been found that achieving an aggressive rake angle (i.e., one that is sharply acute) at the peel edge of the dispensing member or beak may be beneficial. Historically, in order to employ an aggressive rake angle, the length of the beak had to be extended out from the printer and platen to provide the necessary space for the return path of the label-less liner so that this path did not interfere with, for example, the platen. Unfortunately, this meant that to avoid back feeding of the web during printing and dispensing, the spacing between the labels on the web would need to be increased such that the spacing between labels was equal to or greater than the distance between the print head and the peel edge. Among other things, this increase in spacing between labels meant that much of the web was wasted material.

The disclosed apparatus permits a wider range of materials (e.g., of various thicknesses, stiffnesses, etc.) to be used in a label dispensing apparatus with an aggressive rake angle without so severely limiting the spacing between the labels on the web or liner. By including a transition member below the beak or dispensing member, the distance between the print head and peel edge of the dispensing member can be reduced in comparison to a dispensing member having an equal rake angle with no transition member. The peel edge of dispensing member without a corresponding transition member would need be extended further forward in order to avoid interference with the platen if the return path was initially linear. Because the labels can be placed closer together on the web, the amount of backfeeding can be reduced or eliminated altogether and/or the amount of scrap material from the web may be reduced. Additionally, the web can return from a bent or folded configuration at the peel edge of the dispensing member to a planar configuration at the transition member within a short distance (e.g., in a space-efficient or compact manner) which permits the used portion of the web to be ready for rewinding.

According to one aspect of the invention, a label dispensing device is disclosed for dispensing labels from a web carrying labels on a first side thereof and having a web path that extends through the label dispensing device. The label dispensing device includes a dispensing member and a transition member. This dispensing member is shaped to effectuate a flexure of the web. This flexure is in a direction transverse to a direction of travel of the web along the web path. The dispensing member also has a peel edge disposed along a portion of the web path. The transition member has a web control surface disposed along a portion of the web path. The web control surface is downstream of the peel edge along the web path and this web control surface is configured to engage the first side of the web to reduce the flexure of the web effectuated by the dispensing member.

In one form of the device, the dispensing member may be a beak having a first side and a second side that converge at the peel edge. The first side of the beak may be disposed along a portion of the path of the web and may have a surface shaped to effectuate a flexure of the web in a direction transverse to a direction of travel of the path of the web. The transition member may have a web control surface that defines a portion of the web path. The transition member may be disposed on the second side of the beak and may be spaced from the second side of the beak such that the web path can pass there between. When the web turns over the peel edge from the first side of the beak to dispense a label, the device may be configured such that the path of the web turns back toward the second side of the beak and the first side of the web (which originally carried labels) contacts the web control surface of the transition member.

A printer may be disposed along the web path before the peel edge of the dispensing member. The printer may include a print head and a platen between which the web path may pass. In such forms, the transition member may be disposed on a side of the dispensing member opposite a side of the dispensing member shaped to effectuate a flexure of the web such that the web path forms an acute angle at the peel edge. The transition member guides the web path away from the dispensing member and permits a reduction in a distance between the print head and the peel edge of the dispensing member in comparison to a dispensing member providing an equal rake angle but lacking a transition member so disposed (as such a transition member-less construction requires a greater beak length to avoid interference with the platen or other assembly components on the initial section of the linear return path). By reducing the distance between the print head on the peel edge, the spacing between labels on the web can be reduced and/or back feeding of the web can be reduced or eliminated altogether. In some forms, at least a portion of the peel edge of the dispensing member may be non-linear. For example, the peel edge may comprise two substantially linear portions that meet at a nose. The peel edge between the first side and the second side may have a radius or may be relatively pointed.

The dispensing member and the transition member may be integral with one another. However, the dispensing member and the transition member may also be separately formed components. The transition member may be static (i.e., non-moving) or may be a moving component such as, for example, a roller.

The web control surface of the transition member may be straight over its width (which is perpendicular to the path of the web) and may be curved over its length (which is perpendicular to its width). This web control surface enables the web to be returned to a planar configuration after passing over the peel edge, which promotes efficient and reliable web handling. For example, the return of the web to the planar configuration after removing the label allows for the web to be rewound a short distance after the peel edge.

A dispensing member cap may be disposed proximate the dispensing member. This dispensing member cap may have a surface facing, but spaced from, a surface of the dispensing member that is shaped to assist in effectuating the flexure of the web.

According to another aspect of the invention, a method of dispensing labels from a web in which a web path extends through a label dispensing device of the type described above is also disclosed. This method includes feeding the web over the dispensing member toward the peel edge while effectuating a flexure of the web, turning the web over the peel edge and back toward a transition member, and feeding the web over a web control surface of the transition member. The web control surface is downstream of the peel edge and engages the first side of the web to reduce the flexure of the web effectuated by the dispensing member.

Feeding the web over the dispensing member toward the peel edge may flex the web and labels carried thereon. When the web is turned over the peel edge, one of the labels may be separated from the web. Before turning the web over this peel edge, a label carried on the web may be printed on by a printer such that a printed label is dispensed.

The transition member may be disposed on a side of the dispensing member opposite a side of the dispensing member shaped to effectuate the flexure of the web. The web path may form an acute angle at the peel edge and the transition member can reduce a distance between the print head and the peel edge of the dispensing member. For the reasons noted above, this may permit a spacing between labels on the web to be reduced.

These and still other advantages of the invention will be apparent from the detailed description and drawings. What follows is merely a description of a preferred embodiment of the present invention. To assess the full scope of the invention, the claims should be looked to as the preferred embodiment is not intended to be the only embodiment within the scope of the claims.

DETAILED DESCRIPTION OF THE PREFERRED EMBODIMENT

Figure 1:
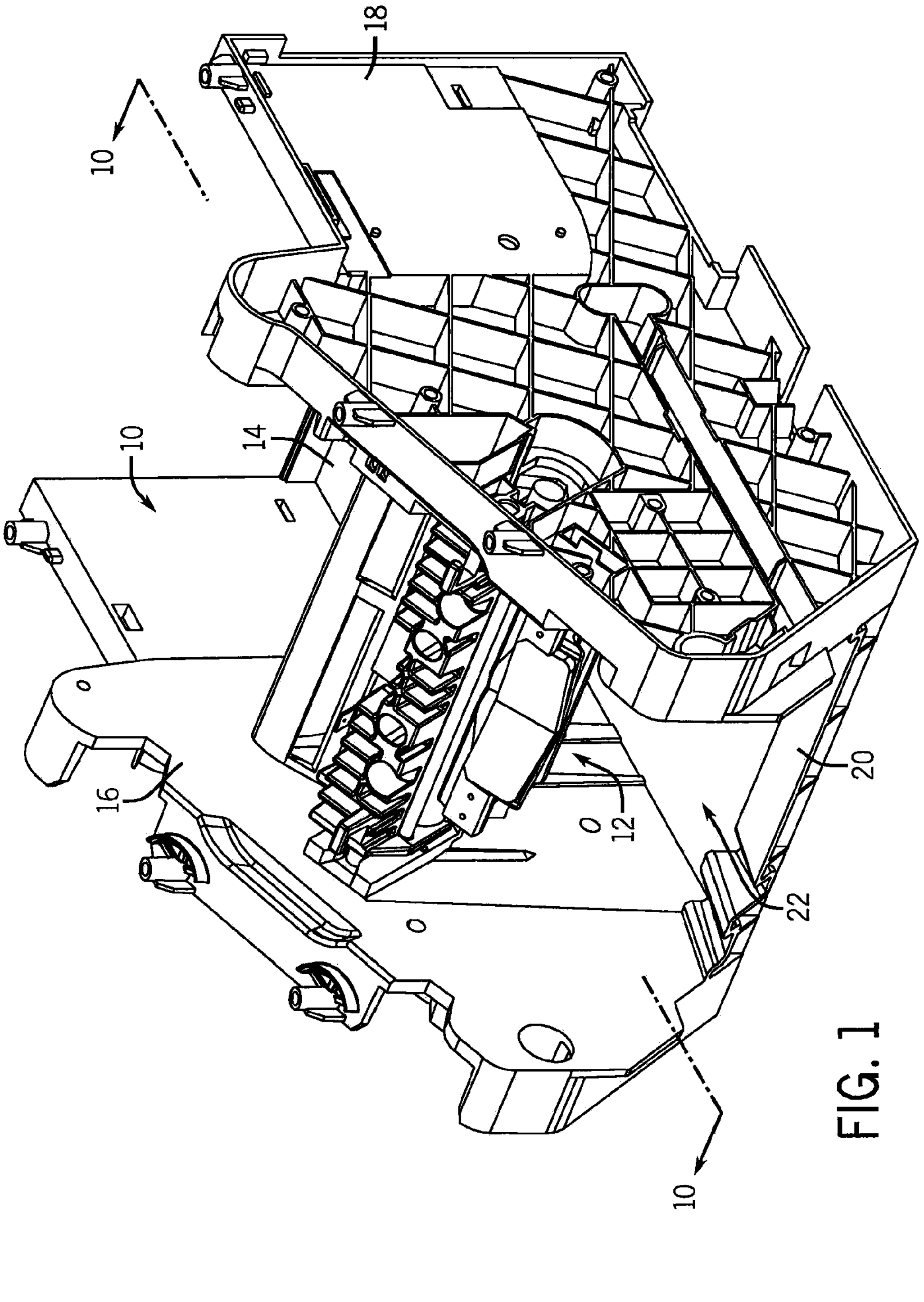
FIG. 1 is a top front side perspective view of a label dispensing device including a printer disposed in a housing.

Referring first to FIG. 1, a portion of a printer is shown for printing of labels on a continuous liner or web (not depicted in FIG. 1, but shown in the cross-section of FIG. 10) and for subsequently separating the printed labels from the liner. The printed labels are separated from the liner by bending the web in a direction transverse to the direction of travel of the web path and then turning the web over a peel edge such that the label, which is more rigid than the liner when bent in the transverse direction, continues forward and separates from the liner while the liner is turned back.

As shown in FIG. 1, the illustrated portion of the printer includes a housing 10 that supports a label dispensing device 12. The housing 10 and the label dispensing device 12 are typically received in a larger housing or a case that includes not only the illustrated components, but also other components such as, for example, components that support a supply of the web (e.g., a roll or a folded stack), components that feed the web through the printer, and components are used to rewind the web after the labels have been separated from the liner.

The housing 10 includes a central carriage 14 extending between two side walls 16 and 18. In the particular form illustrated, a rearward portion of the central carriage 14 is shaped to hold a roll or a cartridge that contains the web for printing. Near a forward portion of the central carriage 14, the housing 10 is shaped to receive and support the various components of the label dispensing device 12. In the particular form of the housing 10 shown, the two side walls 16 and 18 extend further forward than the label dispensing device 12 and the central cartridge 14 and the two side walls 16 and 18 are connected at a lower front end by a front bridge support 20. The front bridge support 20 is spaced from the central carriage 14 and the label dispensing device 12 to provide a gap 22 there between. This gap 22 may provide a portion of the space in which the label dispensing device 12 is located. Depending on the exact configuration of the printer and web path, this gap 22 may further serve as an opening through which a web path can pass.

Figure 2:
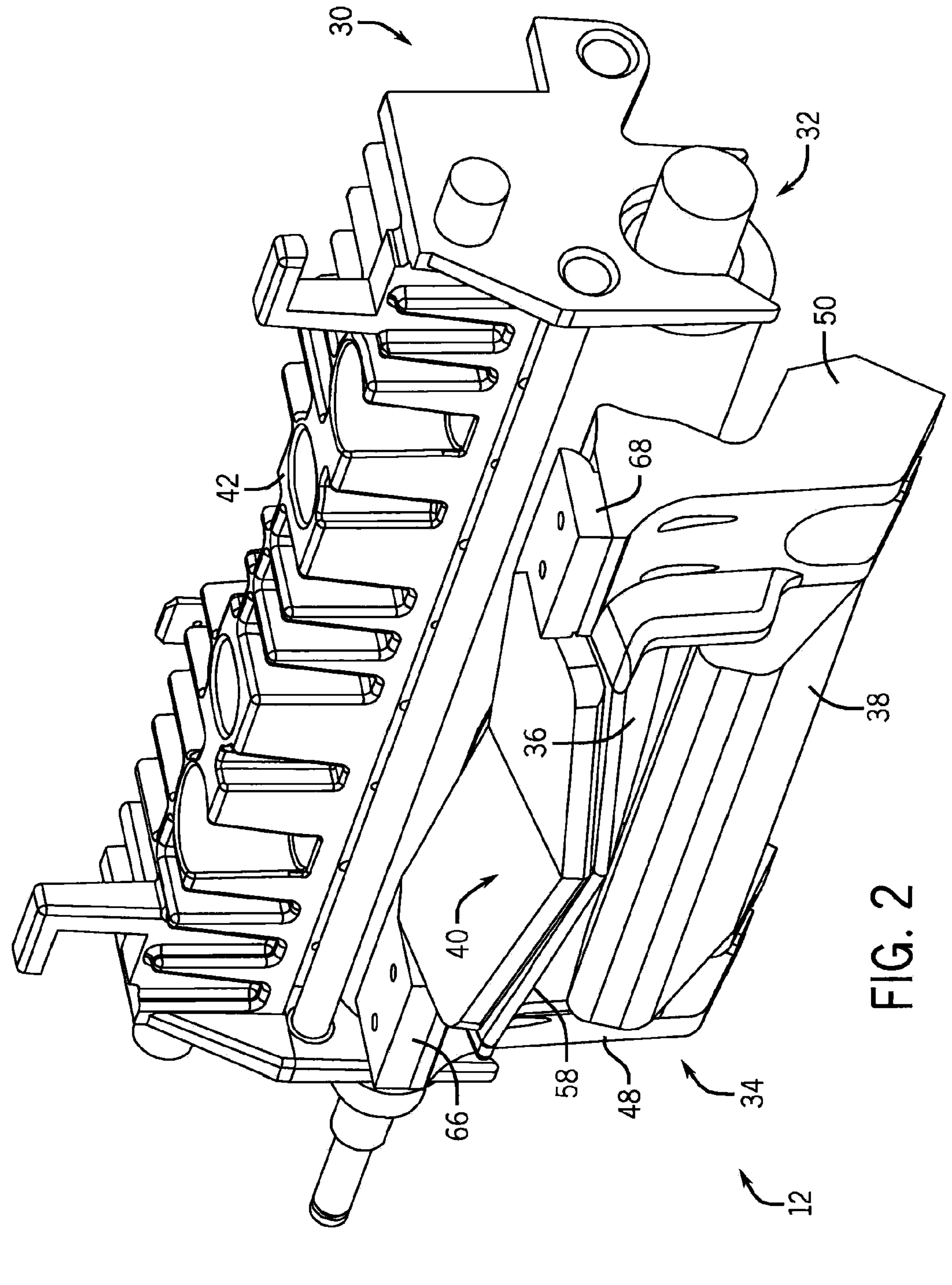
FIG. 2 is a detailed perspective view of the print head, platen, dispensing member, and dispensing member cap apart from the housing.
Figure 3:
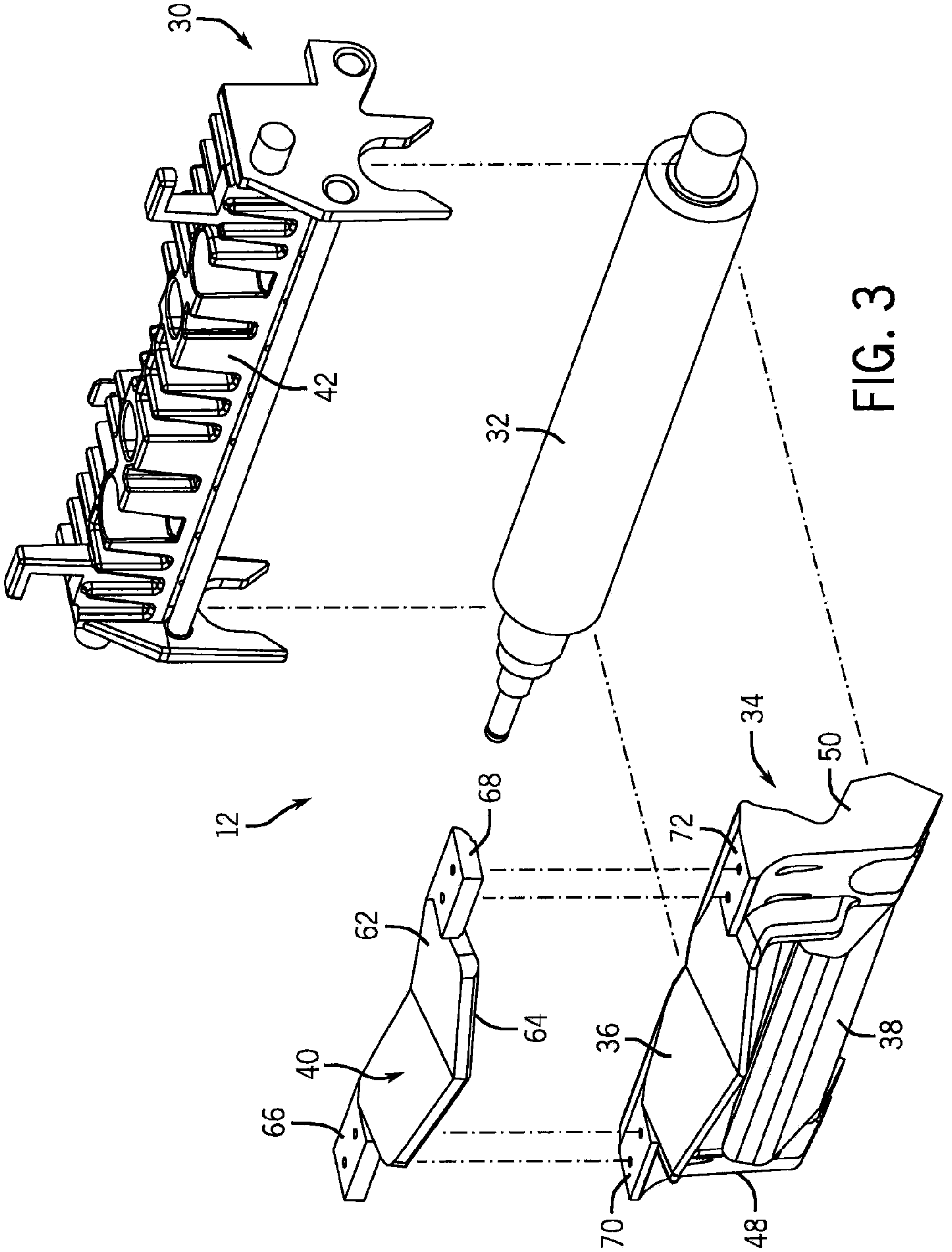
FIG. 3 is a partially exploded view of FIG. 2.
Figure 4:
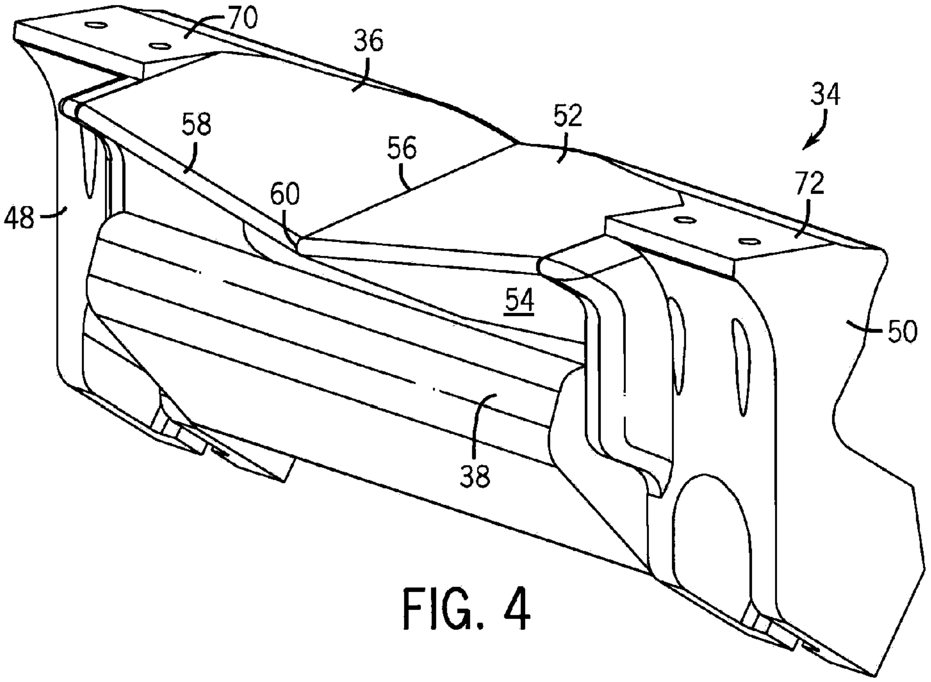
FIGS. 4, 5, 6, 7, and 8 are a top front side perspective view, top view, front view, rear view, and right side view of the dispensing member, respectively.
Figure 5:
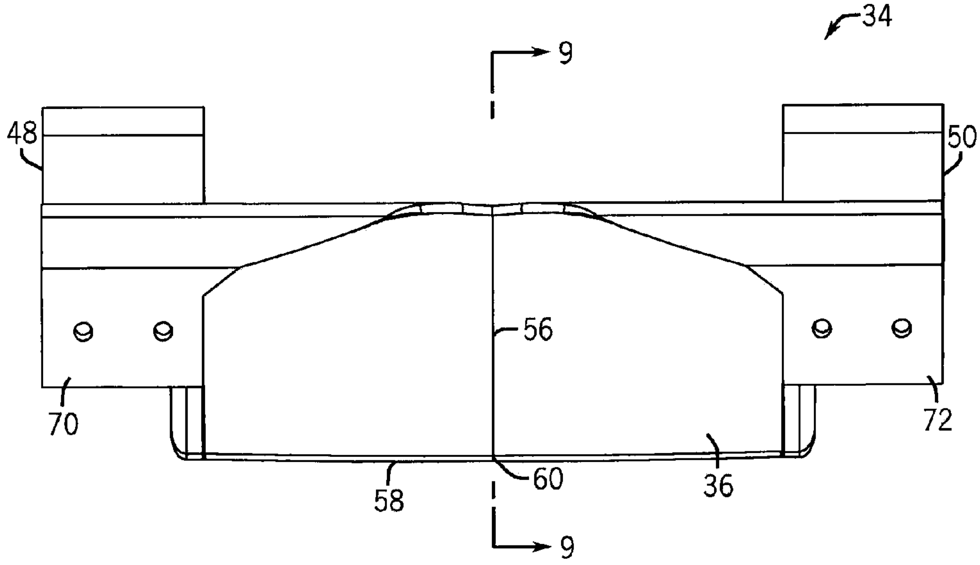
Figure 6:
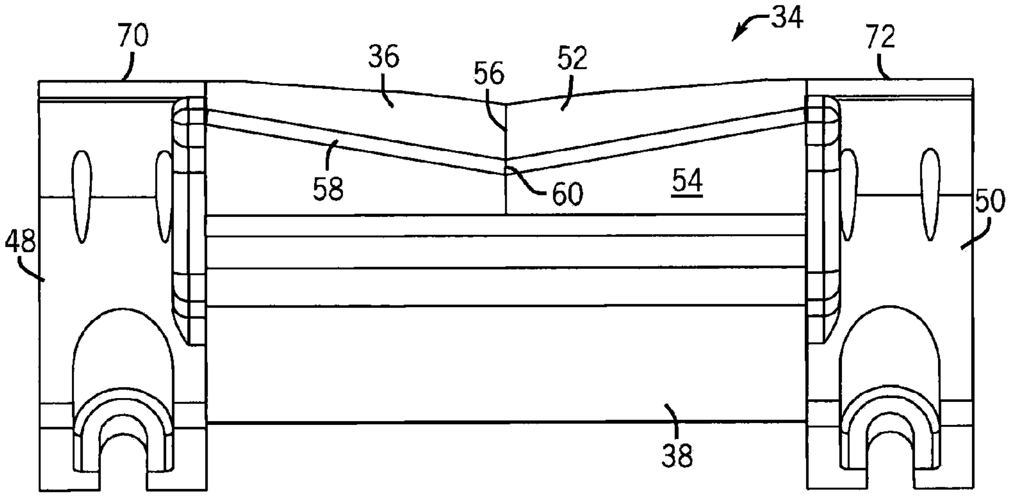
Figure 7:
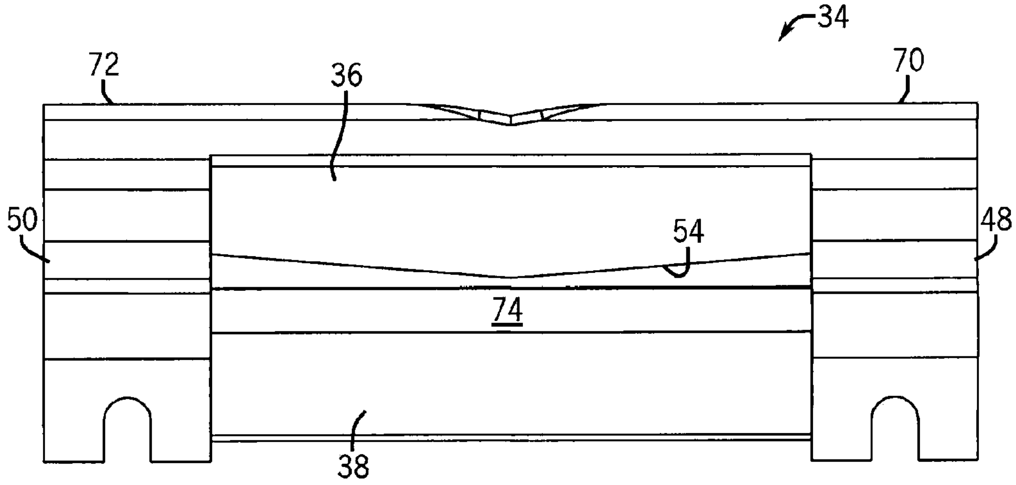
Figure 8:
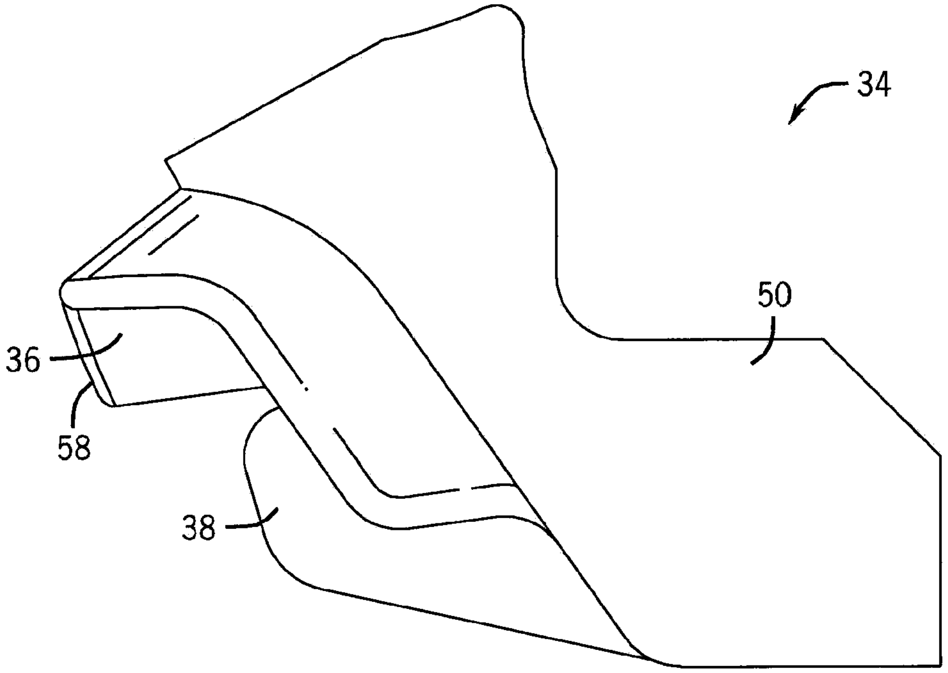
Figure 10:
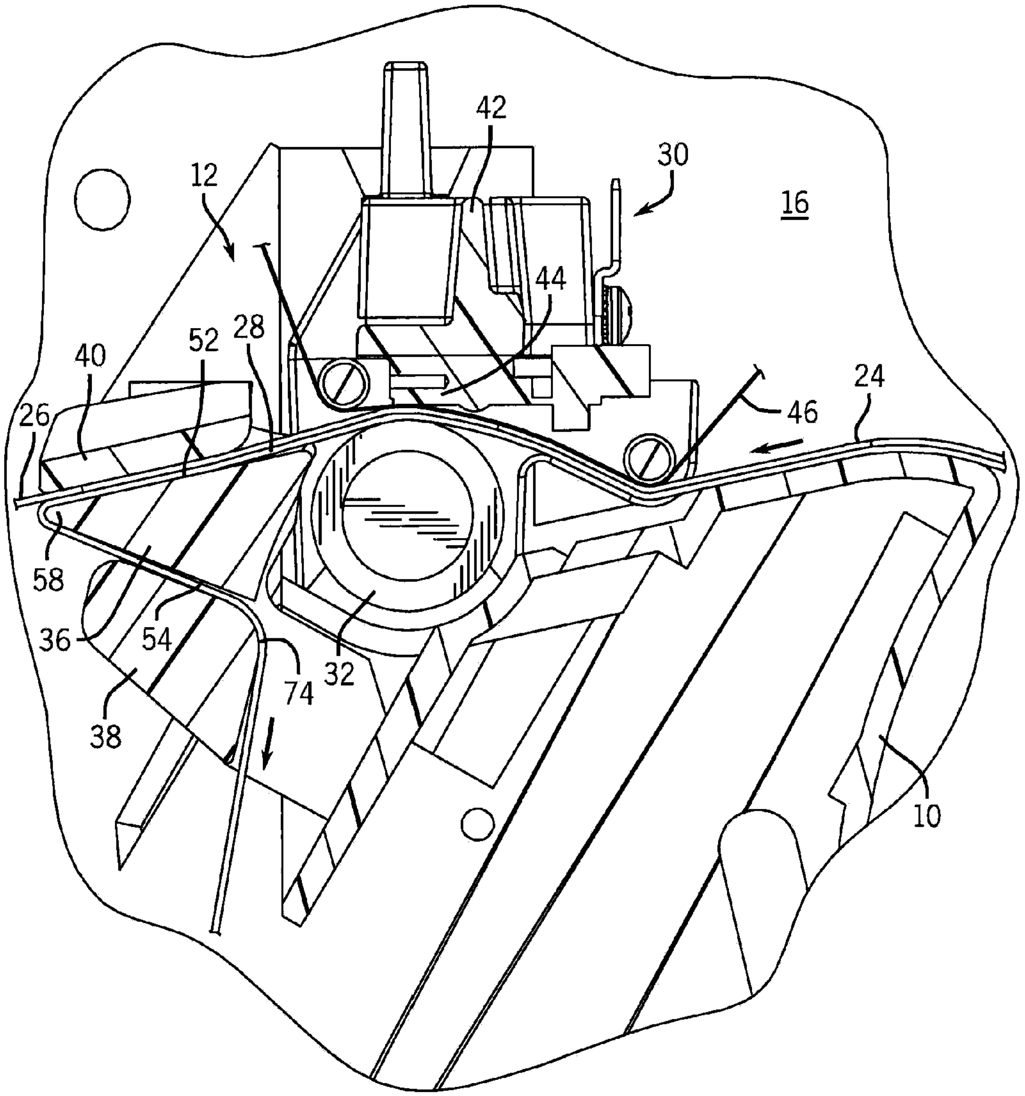
FIG. 10 is a cross-sectional side view taken through line 10-10 of FIG. 1.

Now with additional reference to FIGS. 2, 3, and 10 the various components of the label dispensing device 12 are shown in greater detail. The label dispensing device 12 is a multi-part device that receives a continuous web 24 including die-cut labels 26 on a release liner 28, prints on the labels 26, and then separates the printed labels 26 from the release liner 28. These labels 26 may be of a type having a pressure-sensitive adhesive on one side thereof that permits the die cut labels 26 to be removed from the release liner 28 and then applied to another object by contacting the pressure-sensitive adhesive with the object and applying a force to secure the adhesive bond between the label 26 and the object. To provide context for understanding the operation of the device, arrows are used to indicate the direction of travel of a web 24 in FIG. 10.

In the form illustrated, the label dispensing device 12 includes a printer 30, a platen 32 opposing the printer 30, a unitary element 34 including a dispensing member 36 and a transition member 38, and a dispensing member cap 40 that goes over the dispensing member 36.

As best seen in FIG. 10, the printer 30 is a thermal transfer printer having a heat sink 42 with a thermal print head 44 attached thereto. The thermal print head 44 and the platen 32 are arranged such that the web 24 and an ink ribbon 46 may be fed between the thermal print head 44 and the platen 32. A pressure is applied between the thermal print head 44 and the platen 32 such that, when the thermal print head 44 is selectively heated and the ink ribbon 46 and web 24 are fed between the thermal print head 44 and the platen 32, ink from the ink ribbon 46 is transferred from the ink ribbon 46 to the labels 26 carried on the liner 28. In this way, the labels 26 may be printed.

Other types of printing may also be used to print the labels 26. While thermal transfer printing is provided as one example of a printing process that can be used to print on the labels 26, those having ordinary skill in the art will appreciate that other suitable printing processes may be used.

Further downstream along the web path, the label dispensing device 12 includes the dispensing member 36 or the "beak", the dispensing member cap 40, and the transition member 38. Together, these three elements are used to bend, shape, and form the web 24 such that the label 26 is separated from the liner 28 as the web path extends over the dispensing member 36.

In the form illustrated, the dispensing member 36 and the transition member 38 are both parts of the unitary element 34 and are integral with one another. In this unitary element 34, the dispensing member 36 and the transition member 38 and spaced from one another and are connected by two side arms 48 and 50. The space between the dispensing member 36 and the transition member 38 accommodates the passage of the web 24 there through. However, the dispensing member 36 and the transition member 38 do not need to be integral with one another. Instead, they could be provided as separate components.

This dispensing member 36 or "beak" and the transition member 38 are shown in various views in FIGS. 4 through 9 to illustrate the shape and the form of one exemplary form.

In this form, the dispensing member 36 has a top side 52 and a bottom side 54. The top side 52 of the dispensing member 36 has a valley-like or V-shaped concave surface which slopes downwardly to a central bifurcating line 56. This central bifurcating line 56 divides the top side 52 into two generally symmetrical planar surfaces. This central bifurcating line 56 extends in a direction parallel to the direction of the web path. The bottom side 54 of the dispensing member 36 has a V-shaped convex surface.

Figure 9:
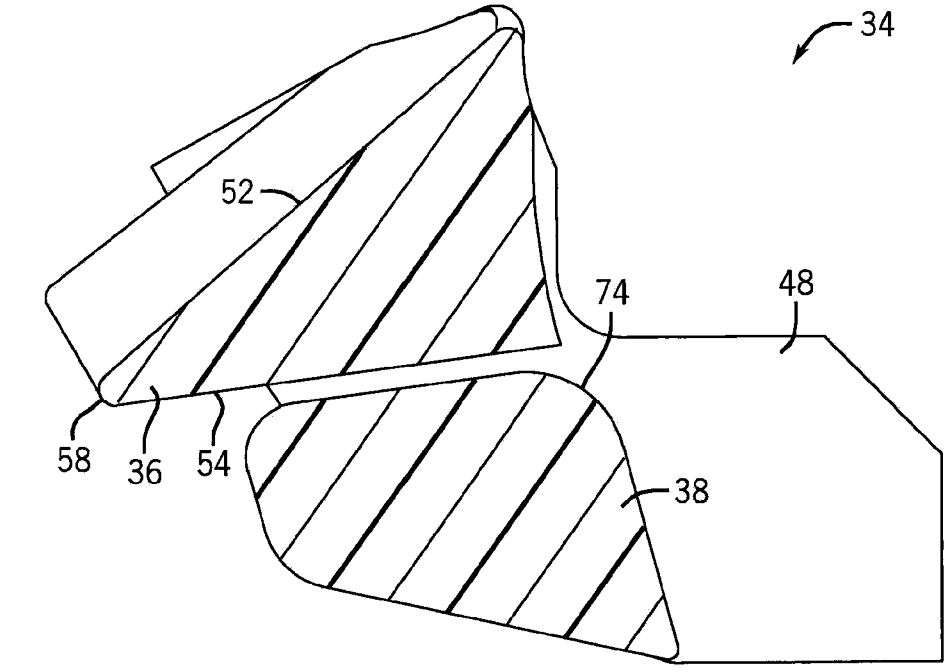
FIG. 9 is a cross-sectional side view of the dispensing member of FIGS. 4 through 8 taken through line 9-9 of FIG. 4.

The V-shaped concave surface of the top side 52 and the V-shaped convex surface of the bottom side 54 are arranged such that they meet at an acute angle (as best shown in FIG. 9) to form a peel edge 58. Because of the shape of the top side 52 and the bottom side 54, the peel edge 58 is also V-shaped with two generally straight linear segments that meet at a nose 60 or a tip. In the form shown, the peel edge 58 is smooth, having a radius as the peel edge 58 transitions from the top side 52 to the bottom side 54. However, in other forms, the peel edge 58 may be differently shaped, having a radius less than or greater than that depicted or may be a straight edge.

It should be appreciated that although the dispensing member 36 as illustrated is a V- or wedge-shaped beak, that the dispensing member could take other forms. For example, the dispensing member may be a peel plate that is essentially a shaped piece of relatively uniform thickness. As will be apparent from the subsequent description, a peel plate mimicking the shape of the top side, the shape of the peel edge, and the proximity of the dispensing member (and more particularly, the peel edge) to the transition member could serve all of the described functions of the wedge-shaped beak. Moreover, it should be appreciated that the dispensing member 36 need not necessarily be V-shaped. Other surface geometries may be employed which cause the transverse flexure of the web 24 before the peel edge 58. For example, the top surface may be curved or differently angled instead including two planar surfaces.

As seen in FIGS. 2, 3, and 10, a dispensing member cap 40 is attached above the top side 52 of the dispensing member 36. This dispensing member cap 40 has a central body 62 including a convexly V-shaped bottom surface 64. On the lateral sides of the central body 62, there are two wings 66 and 68 which may be mounted or otherwise attached to mounting surfaces 70 and 72 on the two arms 48 and 50 on either side of the dispensing member 36. When mounted or attached, a controlled space is created between the convexly V-shaped bottom surface 64 of the dispensing member cap 40 and the concavely V-shaped surface of the top side 52 of dispensing member 36.

This controlled space between the dispensing member 36 and the dispensing member cap 40 is large enough to accommodate the passage of the web 24 including both the liner 28 and the labels 26 carried thereon from the area of the print head 44 to the peel edge 58. Because of the shape of the surfaces of the dispensing member 36 and of the dispensing member cap 40, this controlled space is also designed to effectuate a flexure, shaping or bending of the web 24 travelling along the web path in a direction transverse to the direction of travel of the web 24 along the web path.

Continuing along the web path, the transition member 38 is positioned below and is spaced from the bottom side 54 of the dispensing member 36. The transition member 38 includes a web control surface 74 that is straight over its width (which is perpendicular to the path of the web) and which is curved over its length (which is perpendicular to its width). This web control surface 74 and the transition member 38 are located rearward of the peel edge 58 on the dispensing member 36, such that the when the web 24 wraps over the peel edge 58 (at which point the label is separated) the web is directed back under the dispensing member 36 or beak and over this web control surface 74.

Accordingly, this web control surface 74 defines and is disposed along a portion of the web path. When the web 24 turns over the peel edge 58 from the top side 52 of the dispensing member 36 or beak, the path of the web turns back toward (although does not necessarily contact) the bottom side 54 of the dispensing member 36, forming an acute angle, and then contacts the web control surface 74 of the transition member 38 as it winds back. Because of the arrangement of the components, the top side of the web (which carried the labels before separation), contacts the web control surface 74. Accordingly, between the peel edge 58 and the web control surface 74, the flexure of the web 24 effectuated by the peel edge 58 is eliminated and the web 24 is again planar or flat. This arrangement of the dispensing member 36 and the transition member 38 permits the manipulation of the geometry of the web 24 such that it can go from a planar configuration at the print head 44 to a bent or folded configuration at the peel edge 58 back to a planar configuration at the web control surface 74 so that the web 24 is suitable for rewinding.

In some embodiments, the transition member may be a roller or another moving object. For example, if a roller is used, then the roller surface might constitute the web control surface as described above. Although a static object is shown in the illustrated embodiment, the transition member structure should not be so limited unless otherwise indicated by the language of the claims.

Turning now to FIG. 10, a cross section of the printer is shown in which the continuous web 24 is being fed through the label dispensing device 12. As shown best in FIG. 10, the web 24 snakes in roughly an S-shape over and around the dispensing member 36 and back over the transition member 38.

To summarize the general operation which has been described in parts above, the continuous web 24 is first forward fed between the printer 30 and the platen 32 so that the thermal print head 44 can transfer ink from the ink ribbon 46 onto one of the labels 26. To feed the web, the platen 32 may be driven by a motor or the like. Additionally, although not shown, a rewind mechanism downstream of the dispensing member 36 may provide tension on the web 24 to assist in the forward feed and to ensure that the web 24 is sufficiently taut through the dispensing member 36 and the transition member 38 so that the web 24 will be firmly bent over the peel edge 58.

After printing, the web 24 is then fed over and through the dispensing member 36 toward the peel edge 58. Feeding the web 24 over the top side 52 of the dispensing member 36 toward the peel edge 58 flexes the web 24 and labels 26 carried thereon in a direction transverse to the direction of feed of the web path.

Next, the web 24 is turned over the peel edge 58 and back toward the transition member 38. At this point, the label 26 separates from the liner 28 of the web 24 and this detached label may be attached to an item either manually or using an automated apparatus. As mentioned above, the label 26 separates from the liner 28 because, when the label 26 is bent, the label 26 is stronger or more rigid than the liner 28 and will not follow with the web path over the peel edge 58.

After the web is turned over the peel edge 58, the web 24 (with labels removed) is fed over the web control surface 74 of the transition member 38. The web control surface 74 engages the label-less side of the web 24 to quickly reduce the flexure of the web 24 effectuated by the peel edge 58 of the dispensing member 36.

Thus, while the web 24 is initially flat over its transverse width at the printer 30 and platen 32, the web 24 is quickly bent or folded in over its transverse width as it approaches the peel edge 58 and then returns to a flat or planar arrangement when it passes over the web control surface 74.

Notably, the presence of the transition member 38 according to the described construction allows a reduction in the distance between the printer 30 and the peel edge 58 of the dispensing member 36. This reduction in distance is of significance because conventional beaks or label dispensers often require the web to be back fed after a label is separated from the web so that the next label may be brought back into the area of the printer. Repetitive backward and forward feeding can result in damage and/or failure of the web or potentially jamming of the web. Additionally, back-feeding can, in some instances, require additional motorized components to enable this direction of feeding.

Alternatively, to avoid back-feeding the labels could have been further spaced on the web (e.g., a distance equal to or greater than the distance from the print head to the peel edge). However, a long beak or dispensing member, would increase the distance of spacing between labels and produce more scrap.

The disclosed structure allows the labels on the web to be placed closer together while simultaneously reducing the reliance on back-feeding. While providing this improvement, the disclosed structure also compacts the structure of the dispensing member and the associated transition member, jettisoning a long beak construction for a shorter beak length permitted by the presence of a transition member.

It should be appreciated that the various surfaces along the web path (e.g., the top side 52 of the dispensing member 36 and the web control surface 74) may be made of a material having a low coefficient of friction. Likewise, these surfaces may be coated to alter their frictional qualities. By reducing the coefficient of friction of these bearing surfaces, the possibility that the web may stick will be reduced and the tension in the web may be more accurately controlled between the printer/platen and a downstream tensioning or rewind device.

Many modifications and variations to this preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. A label dispensing device for dispensing labels from a web carrying labels on a first side thereof and having a web path that extends through the label dispensing device, the label dispensing device comprising:

a dispensing member being shaped to effectuate a flexure of the web travelling along the web path, the flexure being in a direction transverse to a direction of travel of the web along the web path, the dispensing member further having a peel edge disposed along a portion of the web path; and a transition member having a web control surface disposed along a portion of the web path curving downwardly away from the dispensing member, the web control surface being downstream of the peel edge and the web control surface being configured to engage the first side of the web to reduce the flexure of the web effectuated by the dispensing member.

2. The label dispensing device of claim 1 wherein the dispensing member is a beak having a first side and a second side that converge at the peel edge in which the first side of the beak is disposed along a portion of the path of the web and has a surface shaped to effectuate a flexure of the web in a direction transverse to a direction of travel of the path of the web.

3. The label dispensing device of claim 2 wherein the transition member has a web control surface that defines a portion of the web path, the transition member being disposed on the second side of the beak and being spaced from the second side of the beak.

4. The label dispensing device of claim 3 wherein, when the web turns over the peel edge from the first side of the beak, the device is configured such that the path of the web turns back toward the second side and contacts the web control surface of the transition member.

5. The label dispensing device of claim 1 further comprising a printer disposed along the web path before the peel edge of the dispensing member.

6. The label dispensing device of claim 5 wherein the transition member is disposed on a side of the dispensing member opposite a side of the dispensing member shaped to effectuate a flexure of the web such that the web path forms an acute angle at the peel edge.

7. The label dispensing device of claim 6 wherein the transition member guides the web away from the dispensing member and permits a reduction in a distance between a print head of the printer and the peel edge of the dispensing member in comparison to a dispensing member providing an equal rake angle but lacking a transition member so disposed.

8. The label dispensing device of claim 5 wherein the printer includes a print head and a platen and a portion of the web path passes between the print head and the platen.

9. The label dispensing device of claim 1 wherein at least a portion of the peel edge of the dispensing member is nonlinear.

10. The label dispensing device of claim 9 wherein the peel edge comprises two substantially linear portions that meet at a nose.

11. The label dispensing device of claim 1 wherein the peel edge between the first side and the second side has a radius.

12. The label dispensing device of claim 1 wherein the dispensing member and the transition member are integral with one another.

13. The label dispensing device of claim 1 wherein the web control surface is straight over its width which is perpendicular to the path of the web and is curved over its length which is perpendicular to its width.

14. The label dispensing device of claim 1 further comprising a dispensing member cap disposed proximate the dispensing member, the dispensing member cap having a surface facing, but spaced from, a surface of the dispensing member shaped to assist in effectuating the flexure of the web.

15. A method of dispensing labels from a web in which a web path extends through a label dispensing device, the label dispensing device including a dispensing member shaped to effectuate a flexure of the web travelling along the web path and carrying labels on a first side of the web, the flexure being in a direction transverse to a direction of travel of the web along the web path, the dispensing member further having a peel edge disposed along a portion of the web path, the method comprising:

- feeding the web over the dispensing member toward the peel edge while effectuating a flexure of the web;
- turning the web over the peel edge and back toward a transition member; and
- feeding the web over a web control surface of the transition member, in which the web control surface is downstream of the peel edge, curves downwardly away from the dispensing member, and engages the first side of the web to reduce the flexure of the web effectuated by the dispensing member.

16. The method of claim 15 wherein feeding the web over the dispensing member toward the peel edge flexes the web and labels carried thereon.

17. The method of claim 16 further comprising, when the web is turned over the peel edge, separating one of the labels from the web.

18. The method of claim 15 further comprising, before turning the web over the peel edge, printing on a label carried on the web at a printer.

19. The method of claim 18 wherein the transition member is disposed on a side of the dispensing member opposite a side of the dispensing member shaped to effectuate a flexure of the web such that the web path forms an acute angle at the peel edge.

20. The method of claim 19 wherein and the transition member guides the web away from the dispensing member and permits a reduction in a distance between a print head of the printer and the peel edge of the dispensing member in comparison to a dispensing member providing an equal rake angle but lacking a transition member so disposed, thereby enabling a spacing between labels on the web to be reduced.

* * * * *